United States Patent [19]

Tomlinson, III

[11] Patent Number: 5,777,763
[45] Date of Patent: Jul. 7, 1998

[54] IN-LINE OPTICAL WAVELENGTH REFERENCE AND CONTROL MODULE

[75] Inventor: Walter John Tomlinson, III, Holmdel, N.J.

[73] Assignee: Bell Communications Research, Inc., Morristown, N.J.

[21] Appl. No.: 586,591

[22] Filed: Jan. 16, 1996

[51] Int. Cl.$^6$ .................................................. H04J 14/02
[52] U.S. Cl. .................................................. 359/130; 358/18
[58] Field of Search .................................................. 359/129, 730, 359/131, 127; 385/18, 20, 37

[56] References Cited

U.S. PATENT DOCUMENTS

| | | | |
|---|---|---|---|
| 4,472,797 | 9/1984 | Nicia | 359/129 |
| 4,707,064 | 11/1987 | Dobrowolski et al. | 359/129 |
| 4,786,133 | 11/1988 | Gidon et al. | 329/130 |
| 4,926,412 | 5/1990 | Jannson et al. | 359/130 |
| 5,026,131 | 6/1991 | Jannson et al. | 359/130 |

OTHER PUBLICATIONS

Accuwave WLK-2 Wavelength Locker Product Literature, 1994, Accuwave Corporation, 1651 19th Street, Santa Monica, CA 90404.

C. Mao et al., "Laser Wavelength Stabilization Using Holographic Filters," Accuwave Corporation, 1651 19th Street, Santa Monica, CA 90404.

*Primary Examiner*—Rafael Bacares
*Attorney, Agent, or Firm*—Joseph Giordano; David Hey; Loria B. Yeadon

[57] ABSTRACT

An apparatus and method for use in an optical system. An in-line optical wavelength reference and control module (WRCM) is inserted in series with an optical fiber signal path between an input fiber and an output fiber. The WRCM includes an input lens, a multi-element grating and an output lens. The input lens couples an input optical signal from the input fiber into the multi-element grating. The multi-element grating includes low-efficiency gratings which reflect portions of the input optical signal having different predetermined characteristics to different detectors of a detector array, while transmitting the remaining portions of the input optical signal to the output lens. The output lens couples the transmitted portions of the optical signal back onto the optical signal path. The WRCM may thus be placed directly in series with an optical signal path. The predetermined characteristics may be selected optical signal wavelengths, such that the WRCM can be used to monitor the optical signal path for the power level and/or drift of a given system wavelength. The multi-element grating may also include one or more highefficiency gratings suitable for delivering substantially all of the optical signal power of a given wavelength division multiplexed (WDM) channel signal to or from a selected node in an optical network system.

27 Claims, 3 Drawing Sheets

IN-LINE OPTICAL WAVELENGTH REFERENCE AND CONTROL MODULE

FIELD OF THE INVENTION

The present invention relates generally to optical signal processing devices, and more particularly to a wavelength reference and control module (WRCM) suitable for insertion directly into an optical signal path to provide various optical signal processing functions.

BACKGROUND OF THE INVENTION

As the demand for optical communication systems, networks and devices has increased, considerable effort has been directed to the development of all-optical signal processing techniques. In particular, the development of optical communications networks using wavelength division multiplexing (WDM) to simultaneously transmit multiple signals at different optical wavelengths on a single optical fiber has created a need for optical signal processing devices to provide reference and control functions.

FIG. 1 shows a portion of an exemplary optical system 10 which implements optical wavelength reference and control functions in accordance with the prior art. An optical signal is transmitted in system 10 over a fiber 15. An optical signal tap 20 is arranged in the signal path of fiber 15 and couples a small portion of the signal passing through fiber 15 onto another fiber 25. The coupling ratio may be on the order of 10 dB or more. The coupled input signal is launched from fiber 25 into a wavelength reference and control module (WRCM) 30 which includes a lens 32. The lens 32 collimates the input signal launched from fiber 25 and directs the signal into a multi-grating element 34. The multi-grating element 34 generally includes two or more distinct holographically written optical gratings shown illustratively in FIG. 1 as gratings 34A and 34B. Each of the gratings 34A, 34B is configured to reflect a portion of the input signal at a given wavelength back through the lens 32 to detectors 36, 38. The detectors 36, 38 may be replaced with optical fibers suitably arranged at the focal plane of lens 32 to collect the reflected portions of the input signal. The module 30 may be configured to perform a wavelength reference function by designing the gratings 34A, 34B to reflect wavelengths slightly offset to either side of a desired reference wavelength.

FIG. 2 shows an exemplary spectral plot of the reflected signal response of the multi-element grating 34 when configured to serve as a reference for a desired optical wavelength $\lambda_0$. One of the gratings 34A in multi-element grating 34 is designed for maximum reflection at a first optical wavelength $\lambda_1$ and the other grating 34B is designed for maximum reflection at a second optical wavelength $\lambda_2$. The two wavelengths $\lambda_1$ and $\lambda_2$ are arranged on either side of the reference wavelength $\lambda_0$ such that an optical signal at wavelength $\lambda_1$ is reflected by grating 34A through lens 32 to optical detector 36, and an optical signal at wavelength $\lambda_2$ is reflected by grating 34B through lens 32 to optical detector 38. The detectors 36, 38 generate corresponding electrical signals indicative of the magnitude of the light reflected from gratings 34A, 34B, respectively. The electrical signals from detectors 36, 38 are supplied to a differential amplifier 40 which generates an error signal indicative of the wavelength of an input signal supplied to module 30 via fiber 25.

If the wavelength of the input signal is at the reference wavelength $\lambda_0$, the amount of reflected light incident on the detectors 36, 38 will be approximately equal, such that the error signal at the output of the differential amplifier 40 will be approximately zero. If the input signal wavelength drifts due to temperature or other system variations toward wavelength $\lambda_1$, more light will be reflected by grating 34A than grating 34B, the detected signal from detector 36 will be larger than the signal from detector 38, and the error signal at the output of amplifier 40 will be take on a higher-magnitude negative value. Alternatively, if the input wavelength drifts toward $\lambda_2$, more light is reflected by grating 34B than by grating 34A, and the error signal takes on a higher-magnitude positive value. The error signal can be utilized in a servo loop to control the input signal wavelength by providing a suitable wavelength adjustment to a laser or other optical source generating the input signal. Additional details regarding the module 30 of FIG. 1 can be found in WLK-2 Wavelength Locker Product Literature, Accuwave Corporation, Santa Monica, Calif. and an accompanying article by C. Mao et al. entitled "Laser Wavelength Stabilization Using Holographic Filters," the disclosures of which are incorporated by reference herein.

Prior art optical signal processing devices such as the WRCM of FIG. 1 suffer from a number of problems. For example, the prior art WRCM does not provide for throughput transmission of any portion of the optical input signal. The entire coupled portion of the input signal is utilized within the module to perform the reference function such that there is no remaining portion and no mechanism suitable for transmitting a remaining portion back to the fiber 15 of system 10. The WRCM is therefore not suitable for direct in-line use and generally requires the separate optical tap 20 to couple off a portion of the optical signal on fiber 15. Another problem is that the prior art WRCM uses only relatively high-efficiency gratings. The gratings used are thus generally fairly thick and designed to reflect most of the incident light at a particular frequency. The relatively high grating efficiency limits the achievable wavelength spacing and the number of gratings which can be effectively incorporated into the multi-element grating 34, thereby unduly restricting the operating bandwidth of module 30.

As is apparent from the above, a need exists for improved optical wavelength reference and control techniques which avoid the separate optical tap requirement, wavelength spacing and grating number limitations, bandwidth restrictions and other problems associated with prior art devices.

SUMMARY OF THE INVENTION

The present invention provides an apparatus and method for wavelength reference and control in an optical system. An in-line optical wavelength reference and control module (WRCM) in accordance with one embodiment of the invention may be inserted in series with an optical fiber signal path between an input fiber and an output fiber. The WRCM includes an input lens, a multi-element grating and an output lens. The input lens couples an input optical signal from the input fiber into the multi-element grating. The multi-element grating reflects portions of the input optical signal having different predetermined characteristics to different detectors of a detector array, while transmitting the remaining portions of the input optical signal to the output lens. The output lens couples the transmitted portions of the optical signal back onto the optical signal path. The WRCM may thus be placed directly in an optical signal path without requiring a separate optical tap. The predetermined characteristics may be selected optical signal wavelengths.

The multi-element grating in accordance with the invention may include a number of different pairs of relatively low-efficiency gratings, with each of the pairs designed to provide maximum reflection of wavelengths on either side of a selected reference wavelength. In this manner the WRCM may be used to monitor the optical signal path for the presence, signal level or drift of a given system wavelength. The multi-element grating may also include one or more relatively high-efficiency gratings such that the WRCM can be used to deliver substantially all of the optical signal power of one or more wavelength division multiplexed (WDM) channel signals both from a fiber to a selected optical network node and from the selected node to the fiber.

In accordance with another embodiment of the invention, a network management control channel is provided in an optical communication network. A number of WRCMs are distributed throughout the network. Each of the WRCMs may interact with an associated transmitter for transmitting an optical signal at a predetermined network management wavelength through the WRCM and onto an optical signal path in which the WRCM is inserted. The WRCM may also include a grating for directing at least a portion of an input optical signal at the network management wavelength to an optical detector. The detector provides a corresponding electrical signal to a processor associated with or incorporated in the WRCM. The processor interprets network management commands and provides network management information regarding the WRCM to the corresponding transmitter for transmission over the network at the network management wavelength. Network management information may be transmitted to and received from each of the remote WRCMs in the network, and the information may be coordinated by a network management system.

The present invention provides an in-line WRCM which may be inserted directly in series with an optical fiber or other optical transmission medium. A WRCM in accordance with the invention thus avoids the need for an optical tap on the signal path to be monitored. In addition, a WRCM in accordance with the invention may utilize gratings which have a relatively low efficiency as compared to the gratings used in prior art devices. The lower grating efficiencies can be achieved using thinner gratings with wider grating bandwidths, such that a larger number of gratings can be accommodated in a given WRCM. This provides numerous advantages in WDM optical systems with high channel densities. For example, a single in-line WRCM can be used to monitor and/or control many different WDM channel carrier wavelengths. Furthermore, as noted above, a WRCM module in accordance with the invention may incorporate one or more high-efficiency gratings tuned to a predetermined wavelength such that substantially all of the optical signal power of a certain signal, such as a network management signal, may be delivered directly from a network signal path to the WRCM or a particular network node.

These and other advantages and features of the present invention will become more apparent from the accompanying drawings and the following detailed description.

DETAILED DESCRIPTION OF THE PREFERRED EMBODIMENTS

The present invention will be illustrated below in conjunction with an exemplary wavelength reference and control module (WRCM). It should be understood, however, that the present invention is not limited to devices which provide reference and/or control functions. The invention is instead more broadly applicable to any type of optical signal processing device in which a processing function is implemented without first requiring conversion to an electrical signal. For example, alternative optical signal processing functions which may be performed by an optical wavelength module in accordance with the present invention include adding and/or dropping one or more wavelength division multiplexed (WDM) channel signals at a particular network node while transmitting the remaining channel signals.

Figure 3:
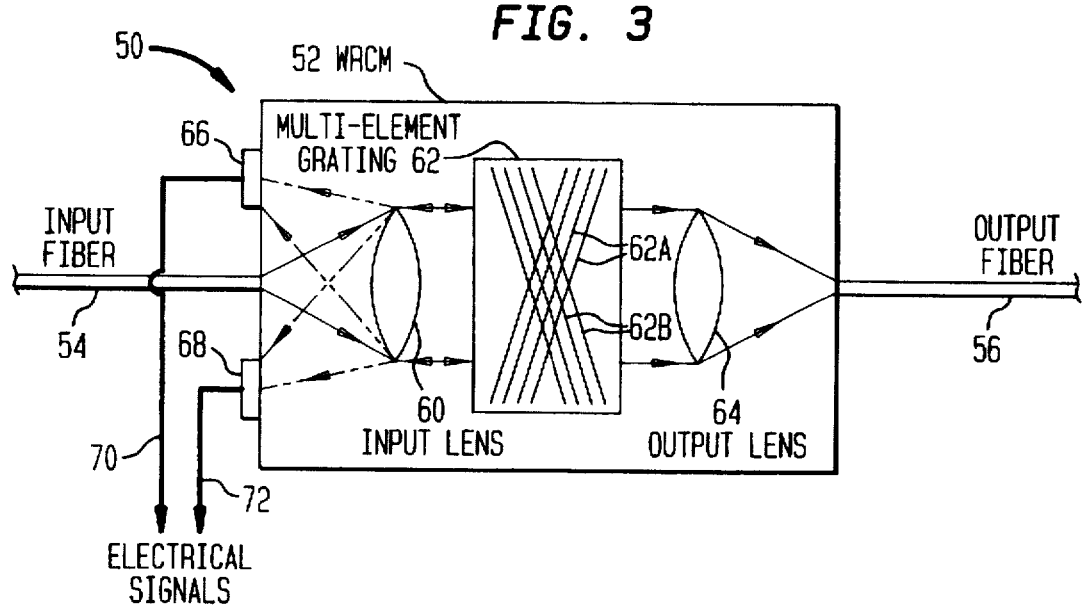
FIG. 3 is an exemplary embodiment of an in-line WRCM in accordance with the present invention.

FIG. 3 shows a portion of an optical system 50 which includes an exemplary in-line WRCM 52 in accordance with the present invention. The WRCM 52 is directly inserted in series in an optical signal path between an input optical fiber 54 and an output optical fiber 56. The WRCM 52 in accordance with the invention includes an input lens 60 which receives an input optical signal launched from fiber 54. The lens 60 collimates the input optical signal and directs it into a multi-element grating 62. The exemplary multi-element grating 62 of the present invention includes at least one pair of gratings formed holographically or using other suitable techniques. One suitable alternative grating formation technique involves stacking together a number of multilayer dielectric-film reflectors and using wedges to position the reflectors at the required angles. The term "multi-element grating" as used herein is intended to include these and other alternative optical wavelength separating devices suitable for reflecting and/or transmitting different input optical signal wavelengths. Unlike prior art WRCM multi-element gratings, the multi-element grating 62 includes low-efficiency gratings 62A, 62B which are specifically designed to transmit a substantial portion of the input signal light incident thereon. The multi-element grating 62 thus transmits a portion of the input signal to an output lens 64. The lens 64 focuses the transmitted portion of the input signal onto the output fiber 56. Alternative optical couplers such as focusing mirrors may be used in place of the input and/or output lenses 60, 64. The serial placement of WRCM 52 in an optical fiber signal path eliminates the optical tap typically used with the above-described prior art devices. The transmitted portion of the input signal, corresponding to the portion not reflected by the multi-element grating 62, may be on the order of about 90 to 99 percent of the total input signal light.

Figure 1:
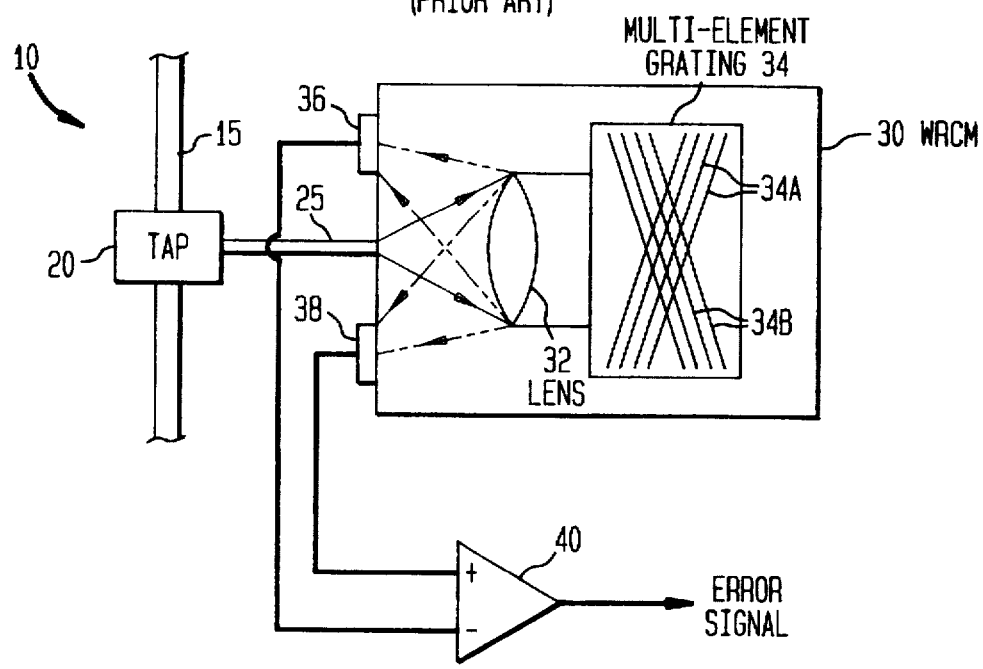
FIG. 1 shows a portion of an optical system which includes a wavelength reference and control module (WRCM) configured in accordance with the prior art.
Figure 2:
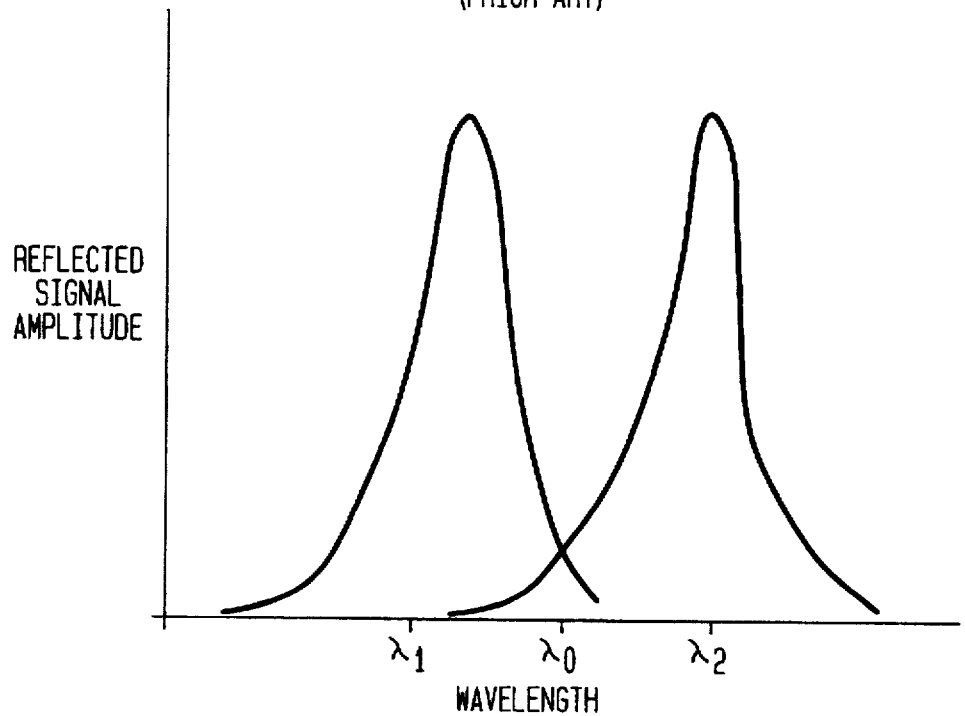
FIG. 2 is a plot of reflected signal amplitude as a function of input signal wavelength for the prior art WRCM of FIG. 1.

Although only a single pair of gratings 62A, 62B are shown in FIG. 3 for clarity of illustration, the multi-element grating 62 in WRCM 52 can include a pair of gratings for each input signal wavelength to be monitored and/or controlled. The gratings 62A, 62B may each be designed in a conventional manner to provide maximum reflection of a predetermined wavelength on either side of a given reference wavelength as described above in conjunction with FIG. 2. The reflection response peaks of the gratings 62A, 62B may be separated by about one nanometer, although the actual separation used for a given grating pair will generally vary depending on the application. The gratings 62A, 62B reflect input signals falling at the predetermined wavelengths onto detector arrays 66, 68, respectively. In an embodiment which includes multiple pairs of gratings, the detector arrays 66, 68 may include one or more detectors arranged at a focal plane of lens 60 to receive the signal light reflected from each of the gratings. As shown in FIG. 3, the signal light reflected by gratings 62A, 62B is incident on detector arrays 66, 68, respectively, and is converted therein to electrical signals which are output from WRCM 52 on lines 70, 72, respectively. The lines 70, 72 may be supplied to a differential amplifier (not shown) to provide an error signal as described above in conjunction with FIGS. 1 and 2, or may be otherwise processed as required in a given application.

The detector arrays 66, 68 may include large-area detectors in order to improve misalignment tolerance. The detector arrays 66, 68 could also be configured as circular arrays in order to improve tolerance to off-axis aberrations in the lens 60. In alternative embodiments, the detector arrays 66, 68 could be replaced by optical output fibers arranged at appropriate points along the focal plane of lens 60 to receive the reflected portions of the input signal from each of the gratings in multi-element grating 62. It may be preferable in certain applications to use multi-mode fibers as output fibers for this purpose in order to improve misalignment tolerance. The reflected signals from lens 60 incident on each of the output fibers may then be supplied as optical signals to a suitable detector array to be processed to generate error signals or other control signals.

The gratings 62A, 62B of WRCM 52 are configured in accordance with the invention to have a relatively low efficiency. For example, the gratings may have an efficiency as low as a few percent or less. These low efficiencies can be achieved using gratings which are significantly thinner than those used in prior art devices. The grating bandwidths can thus be increased and a larger number of grating pairs can be accommodated in a given module. These features provide significant advantages in applications such as high-density WDM networks in which a large number of modulated channel signal carrier wavelengths are simultaneously transmitted over a given optical signal path. Although illustrated in FIG. 3 as using an exemplary multi-element grating, the WRCM of the present invention may utilize alternative multi-element gratings formed using a variety of other optical signal-directing elements such as the above-noted multilayer dielectric-film reflectors.

The WRCM 52 of FIG. 3 may be used to determine the presence, power level and/or wavelength offset of each of a number of WDM channel signals transmitted along an optical signal path which includes input fiber 54 and output fiber 56. As noted above, the WRCM may include a pair of gratings 62A, 62B for each of the WDM channel signal carrier wavelengths to be monitored. The grating pair corresponding to a particular WDM channel signal will reflect channel signal light falling on either side of the desired channel signal carrier wavelength. The corresponding pair of detectors in detector arrays 66, 68 generate electrical signals indicative of the amount of channel signal light at the grating wavelengths. The electrical signals may then be processed in a straightforward manner to determine whether a given channel signal is present on the optical signal path, the approximate channel signal power level and/or whether the channel signal wavelength has drifted to one side or the other of a given reference wavelength.

Figure 4:
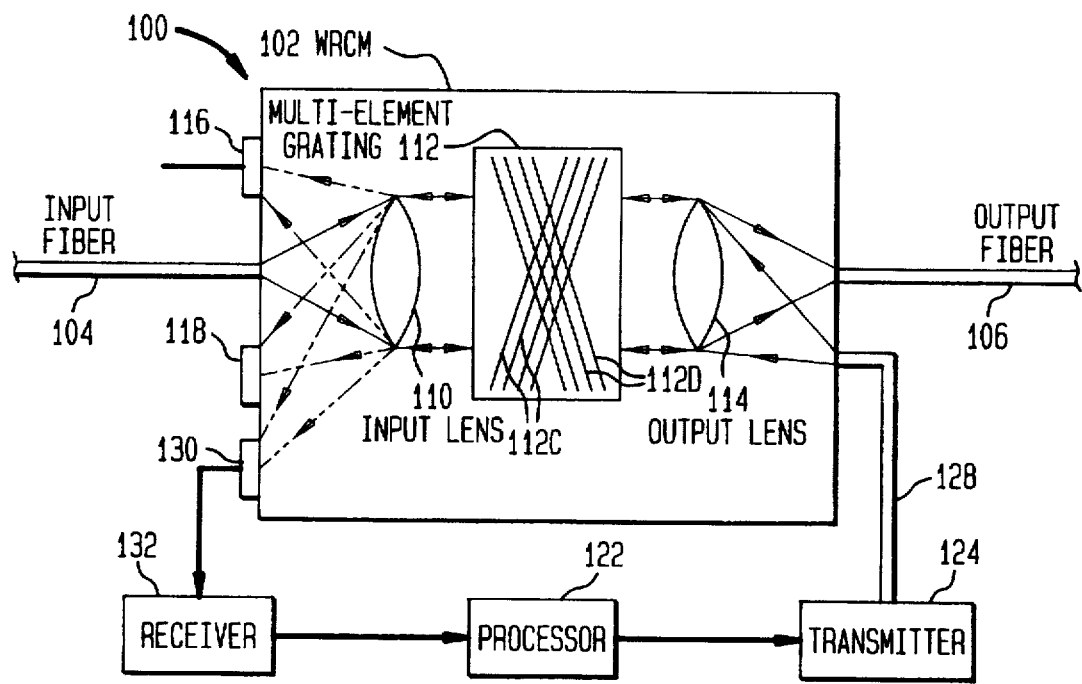
FIG. 4 is another exemplary embodiment of a WRCM in accordance with the present invention which incorporates an optical receiver and transmitter for implementing control functions.

FIG. 4 shows a portion of an optical system 100 which includes a WRCM 102 in accordance with another exemplary embodiment of the present invention. The WRCM 102 is inserted in a system optical signal path between an input fiber 104 and an output fiber 106. The WRCM 102 includes an input lens 110 which receives an input signal from the input fiber 104, a multi-element grating 112 which transmits a portion of the input signal to an output lens 114 and reflects portions of the input signal to detector arrays 116, 118. The output lens 114 delivers the transmitted portion of the input signal to the output fiber 106. Like the multi-element grating 62 of FIG. 3, the multi-element grating 112 may include a pair of gratings (not shown) for each of the input signal wavelengths to be monitored and/or controlled. These grating pairs reflect input signal light onto detector arrays 116, 118 in a manner similar to that described above in conjunction with FIG. 3. The multi-element grating 112 further includes an additional grating pair 112C, 112D designed to reflect light at a network management control wavelength $\lambda_C$. The wavelength $\lambda_C$ is a system channel wavelength designated for use in network management control functions.

The network management control functions are provided in conjunction with WRCM 102 by a processor 122 which may be a computer, microprocessor, applicationspecific integrated circuit (ASIC) or other suitable digital data processor. The processor 122 provides network management information in digital form to a transmitter 124 which modulates the control information onto a network management signal having an optical carrier at wavelength $\lambda_C$. The transmitted network management signal is supplied via an optical fiber 128 to the WRCM 102 and is launched from the fiber 128 toward the lens 114. The lens 114 collimates the network management signal and directs it onto the multi-element grating 112. The grating 112C in multi-element grating 112 is generally a high-efficiency grating designed to reflect substantially all of the network management signal light at wavelength $\lambda_C$ back through lens 114 and onto the output fiber 106. The efficiency of grating 112C is therefore preferably as close to 100% as possible in order to prevent light from the transmitter 124 from passing through the grating 112C and lens 110 and onto a receiver detector 130 or detector arrays 116, 118.

The grating 112D in multi-element grating 112 is a high-efficiency grating designed to reflect a portion of an input signal supplied via input fiber 104 to the receiver detector 130. The portion of the input signal representing the network management channel at wavelength $\lambda_C$ is directed by input lens 110 onto the multi-element grating 112 and is reflected by grating 112D back through lens 110 to the receiver detector 130. The output of receiver detector 130 is an electrical signal which is supplied to a receiver 132. The receiver 132 recovers the network management information placed on the channel carrier wavelength $\lambda_C$ by transmitters associated with other WRCMs in an optical network or with a central network management control system. The processor 122 is coupled to the receiver 132 and performs a variety of network management functions such as, for example, interpreting incoming network management messages, processing information transmitted from various wavelength reference modules in an optical network, and sending outgoing network management information to the transmitter 124. The transmitter 124 and receiver 132 may operate at a relatively low data rate on the order of a few hundred kbits/sec. This would permit a relatively simple, low power and low cost implementation of the above-noted network management functions. Of course, any of a number of alternative data rates could also be used.

The exemplary WRCM 102 with processor 122, transmitter 124 and receiver 132 is particularly well-suited for use in an optical network which the WRCM is part of or arranged in proximity to an isolated transparent network element, such as an optical in-line amplifier or a wavelength cross-connect device. These and other isolated network elements may have no other way of transmitting network management information to the network management system, since data channels typically pass through these elements without any optical/electrical conversions. The WRCM 102 utilizes a dedicated network management channel which enables remote network elements to transmit and receive network management information to and from other network elements without the need for optical/electrical conversions on system data channels. Each WRCM associated with an isolated network element could thus be configured to include a transmitter, receiver and processor in accordance with FIG. 4, while those NRCMs which are located in close proximity to a central network management control system could utilize direct wired connections with the network management system. The transmitter, receiver and processor associated with a given remote WRCM may be incorporated into a network element located near that WRCM, with appropriate wired connections provided between the WRCM and the network element.

An alternative embodiment of the exemplary WRCM 102 of FIG. 4 could utilize a single grating for both transmission and reception of the network management signal at wavelength $\lambda_C$. The fiber 128 would generally be located on the opposite side of output fiber 106 in such an embodiment. The single grating would replace grating pair 112C, 112D and would be configured to provide both reflection of a transmitted network management signal onto output fiber 106 and reflection of a received network management signal onto the receiver detector 130. It should be noted that this alternative configuration will generally result in an increased potential for interference between the transmitter 124 and receiver 132. The potential interference could be controlled by adopting an appropriate system operating protocol in which, for example, the receiver 132 is turned off or otherwise prevented from receiving input signals when the transmitter 124 is transmitting output signals.

Figure 5:
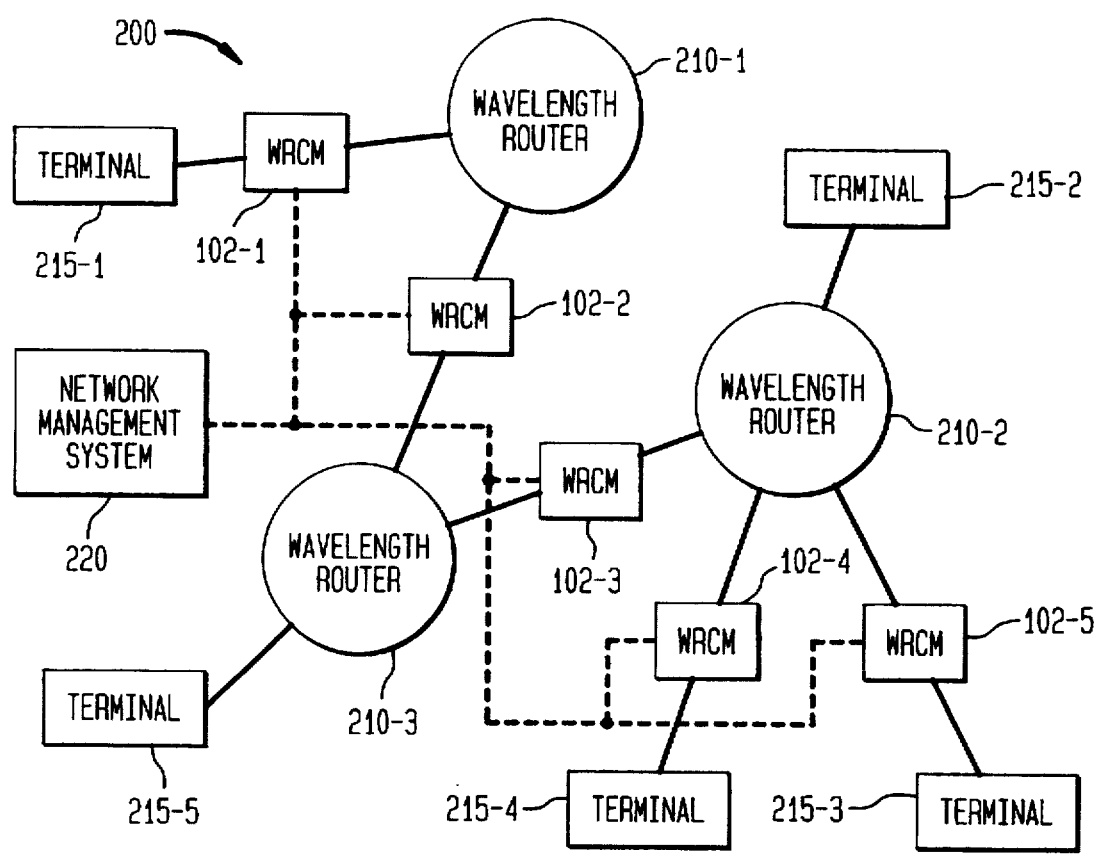
FIG. 5 is a block diagram of an optical communication network including multiple WRCMs and a network management system in accordance with the invention.

FIG. 5 shows an exemplary optical communication network 200 in which a plurality of network wavelength routers 210-i, i=1, 2, . . . $N_1$ are used to provide wavelength division multiplexed (WDM) optical communication between communication terminals 215-i, i=1, 2, . . . $N_2$. Each of the terminals 215-i may transmit data on one or more WDM optical channel signals at a given channel signal wavelength or wavelengths in a conventional manner. The wavelength routers 210-i route the network channel signals to the appropriate portions of the network 200 in accordance with well-known techniques. The system 200 further includes a number of WRCMs 102-i, i=1, 2, . . . $N_3$ which are arranged in various locations in the network 200 to perform wavelength reference, control and other network functions. For example, the WRCM 102-1 may be used by network management system 220 to determine if a particular channel signal expected to be transmitted from terminal 215-1 is present on the optical path between terminal 215-1 and wavelength router 210-1, or if the transmitted channel signal has the appropriate power level and/or wavelength. The dashed lines shown between each of the WRCMs of FIG. 5 and the network management system 220 may each represent a direct wired connection or a portion of the above-described network management channel. Each of the WRCMs 102-i and the network management system 220 may therefore have a processor, transmitter and receiver associated therewith in the manner described above in conjunction with FIG. 4. The WRCMs can thereby communicate reference and control information derived from monitoring the various optical signals passing through network 200 back to the network management system 220.

A WRCM in accordance with the present invention may implement numerous alternative optical signal processing functions. For example, a WRCM associated with a given node of an optical network may be used to deliver a signal at a particular wavelength to or from that node while transmitting all other system wavelengths through the node. The given wavelength may be a WDM channel signal carrier wavelength which is to be processed in the given node by demodulating and/or remodulating the carrier wavelength. A WRCM designed to deliver a given channel signal for further processing may include one or more high-efficiency gratings designed to reflect substantially all of the input optical signal power at the wavelength of the given channel. The reflected light may be incident on a detector which demodulates the optical carrier to provide an electrical signal. This exemplary WRCM may also include a transmitter configured in a manner similar to that shown in FIG. 4 to transmit a remodulated channel carrier signal at the dropped wavelength back onto the optical fiber signal path.

An in-line WRCM as described above in conjunction with FIGS. 3 or 4 may include one or more high-efficiency gratings designed to provide other signal monitoring functions. One possible embodiment could utilize a high-efficiency narrowband grating to sample the optical noise level at a wavelength near a given signal wavelength. It would be difficult for prior art devices to monitor relatively low optical noise levels in this manner without tapping off a substantial amount of the signal power from the corresponding signal path. It should also be noted that a multi-element grating in accordance with the invention may be implemented as a stack of two or more units with different gratings in each unit. Such an implementation would be particularly useful in an embodiment which includes both thin low-efficiency gratings and thick high-efficiency gratings and/or in an embodiment in which the total number of gratings required would call for a larger total refractive index change than that provided by the medium in which the gratings are formed.

The above-described embodiments of the invention are intended to be illustrative only. Numerous alternative embodiments may be devised by those skilled in the art without departing from the scope of the following claims.

We claim:

1. An apparatus for monitoring an optical signal in an optical communications system where the optical signal is transmitted over an optical signal path, the apparatus comprising:

an input optical coupler arranged within the optical signal path to receive the optical signal;

an output optical coupler arranged within the optical signal path;

an optical detector configured to convert optical signals into electrical signals; and a multi-element grating arranged to receive the optical signal from the input coupler, wherein the multi-element grating directs a first portion of the optical signal to the optical detector for signal monitoring and directs a second portion of the optical signal to the output optical coupler for coupling the second portion to the optical signal path.

2. The apparatus of claim 1 wherein the optical signal path is an optical fiber signal path and wherein the input coupler is optically coupled to an input fiber of the optical fiber signal path and the output coupler is optically coupled to an output fiber of the optical fiber path.

3. The apparatus of claim 1 wherein the optical signal is a wavelength division multiplexed (WDM) optical signal including a plurality of optical channel signals.

4. The apparatus of claim 1 wherein the input and output optical couplers include input and output lenses, respectively.

5. The apparatus of claim 1 wherein the predetermined characteristic is a predetermined wavelength at or near a desired wavelength of the optical signal.

6. The apparatus of claim 1 wherein the multi-element grating includes a plurality of pairs of holographically-written gratings, wherein each pair of gratings provides maximum reflection of input signal wavelengths offset on either side of a reference wavelength.

7. The apparatus of claim 1 wherein each of a plurality of gratings in the multi-element grating is adapted to provide maximum reflection of a different input optical signal wavelength.

8. The apparatus of claim 1 wherein the multi-element grating includes a plurality of gratings having an efficiency of less than about ten percent.

9. The apparatus of claim 1 further including:

a transmitter operative to transmit a second optical signal through the output coupler and into the multi-element grating; and an additional grating in the multi-element grating arranged to receive the second optical signal from the output coupler and to reflect a portion thereof onto the optical signal path.

10. The apparatus of claim 9 wherein the second optical signal corresponds to a network management channel signal carrying network management information.

11. The apparatus of claim 1 further including:

an additional grating in the multi-element grating arranged to receive a second optical signal from the input coupler; and a receiver arranged to receive an electrical signal corresponding to a reflected portion of the second optical signal.

12. A method for monitoring an optical signal in an optical communications system where the optical signal is transmitted over an optical signal path, the method comprising the steps of:

coupling an input optical signal transmitted over the signal path to a multi-element grating; and the multi-element grating directing a first portion of the input optical signal to an optical detector for signal monitoring and directing a second portion of the input optical signal onto the optical signal path.

13. The method of claim 12 wherein the optical signal is a wavelength division multiplexed (WDM) optical signal including a plurality of optical channel signals.

14. The method of claim 12 wherein the predetermined characteristic is a predetermined wavelength at or near a desired wavelength of the optical signal.

15. The method of claim 12 wherein the multi-element grating includes a plurality of pairs of holographically-written gratings, wherein each pair of gratings provides maximum reflection of input signal wavelengths offset on either side of a reference wavelength.

16. The method of claim 12 wherein each of a plurality of gratings in the multielement grating is adapted to provide maximum reflection of a different input optical signal wavelength.

17. The method of claim 12 wherein the multi-element grating includes a plurality of gratings having an efficiency of less than about ten percent.

18. The method of claim 12 further including the steps of:

transmitting a second optical signal through the output coupler and into the multi-element grating; and reflecting a portion of the second optical signal from an additional grating in the multi-element grating onto the optical signal path.

19. The method of claim 18 wherein the second optical signal corresponds to a network management channel signal carrying network management information.

20. The method of claim 12 further including the steps of:

receiving a second optical signal through the input coupler and into the multi-element grating; and reflecting a portion of the second optical signal from an additional grating in the multi-element grating onto a second optical detector.

21. The apparatus of claim 1, wherein the optical detector is configured to determine at least one of a presence, signal level, and drift of the optical signal.

22. The apparatus of claim 1 wherein the optical detector is a large-area detector.

23. The apparatus of claim 1 wherein the optical detector is a circular array.

24. The apparatus in accordance with claim 1 further comprising a processing circuit connected to the optical detector and configured to receive a network management control signal and to recover network management information from the network management control signal; and a transmitter connected to receive an output of the processor circuit and to transmit the network management control signal to the side of the multi-element grating that directs the portion of the optical signal to the output optical coupler, the output optical coupler receiving from the multi-element grating the network management control signal and coupling the network management control signal to the optical signal path.

25. The apparatus of claim 24, wherein the processing circuit is configured to provide network management information to the transmitter.

26. The apparatus of claim 25, wherein the transmitter is configured to modulate the network management information onto the network management control signal.

27. The apparatus of claim 24 wherein the multi-element grating includes a high efficiency grating designed to reflect light at the network management control signal wavelength.

* * * * *